United States Patent [19]

MacGregor

[11] Patent Number: 4,803,896
[45] Date of Patent: Feb. 14, 1989

[54] MARINE GEAR CASING

[75] Inventor: Richard A. MacGregor, Wakefield, Mass.

[73] Assignee: General Electric Company, Schenectady, N.Y.

[21] Appl. No.: 915,961

[22] Filed: Oct. 6, 1986

Related U.S. Application Data

[63] Continuation of Ser. No. 668,128, Nov. 5, 1984.

[51] Int. Cl.$^4$ .................................... F16H 57/02
[52] U.S. Cl. .................................. 74/606 R; 74/607
[58] Field of Search ................. 74/606 R, 606 A, 607, 74/421 R, 421 A

[56] References Cited

U.S. PATENT DOCUMENTS

| | | | |
|---|---|---|---|
| 831,803 | 6/1908 | Joy | 74/606 |
| 1,073,073 | 9/1913 | Huff | 74/606 |
| 1,143,661 | 6/1915 | Sternbergh | 74/606 |
| 1,164,419 | 12/1915 | Smith et al. | 74/606 |
| 1,305,019 | 5/1919 | Starker et al. | 74/606 |
| 1,326,661 | 12/1919 | Hewitt et al. | 74/606 |
| 1,418,282 | 6/1922 | Buckingham | 74/606 |
| 1,422,622 | 7/1922 | Riddle | 74/606 |
| 1,425,094 | 8/1922 | Hudson | 74/606 |
| 1,451,173 | 4/1923 | Miebach et al. | 74/606 |
| 3,772,938 | 11/1973 | Johnson | 74/606 R |
| 4,484,491 | 11/1984 | Cocking | 74/606 R |

FOREIGN PATENT DOCUMENTS

| | | | |
|---|---|---|---|
| 858920 | 7/1949 | Fed. Rep. of Germany | 74/606 R |
| 1032635 | 6/1958 | Fed. Rep. of Germany | 74/606 R |
| 1039172 | 10/1953 | France | 74/606 R |
| 162185 | 11/1973 | Netherlands | 74/606 R |
| 357915 | 1/1931 | United Kingdom | 74/606 |
| 344703 | 3/1931 | United Kingdom | 74/606 R |
| 355963 | 9/1931 | United Kingdom | 74/606 |
| 1227231 | 4/1971 | United Kingdom | 74/606 R |
| 1430372 | 3/1976 | United Kingdom | 74/606 R |

Primary Examiner—Richard E. Moore
Assistant Examiner—Vinh Luong
Attorney, Agent, or Firm—Jerome C. Squillaro

[57] ABSTRACT

A one-piece marine gear casing includes a cross-shaped slot therein as seen in a plan view. The cross-shaped slot permits lowering a bull gear with its attached shafts into the gear casing. The slot is transversely braced after installation of the bull gear to reduce the possibility of vibration of the housing. The cross-shaped slot is enlarged at its lower extremity to permit the installation of upper bearing halves in opposition to lower bearing halves in the gear casing. The upper and lower bearing halves provide rotatable support for the shafts of the bull gear. Upper surfaces of the gear casing provide support for additional lower bearing halves for the shafts of gears and pinions employed to transmit torque from one or more input shafts to the bull gear.

3 Claims, 4 Drawing Sheets

MARINE GEAR CASING

This is a continuation of application Ser. No. 668,128 filed on Nov. 5, 1984 now abandoned.

BACKGROUND OF THE INVENTION

The present invention relates to propulsion systems and, more particularly, to gear casings for marine propulsion equipment.

One or more gas or steam turbines are favored prime movers in certain marine vessels. There are a number of problems which must be overcome before the shaft output of a gas or steam turbine may be employed to drive the vessel. The principal problem arises from the fact that efficient operation of a gas or steam turbine occurs at a relatively high shaft speed of, for example, about 6000 RPM whereas a conventional marine propulsion screw requires a shaft speed about 25 times slower. Thus, a reduction gearing assembly is conventionally required between the output shaft of the gas or steam turbine and the propeller shaft. Such conventional reduction gearing assembly accomplishes the shaft speed reduction in two stages. The first stage of reduction employs a pinion driven by the gas or steam turbine shaft driving a pair of first stage reduction gears. The second stage of reduction employs second pinions driven by the first stage reduction gears. The second pinions mesh with a second, or final, gear, colloquially known as a bull gear because of its large size. The bull gear is coaxially connected to the propeller shaft.

Designers of marine vessels always place reduction in size and weight of all components in a marine vessel high on their want list. This is especially true of vessels designed for high speed. A casing for containing a gearing assembly is a difficult subject for size and weight reduction because of the inherently large size of the bull gear required to carry the shaft torque and also because the structure of the casing must be rigid enough to withstand torque-derived twist. If such twist is not satisfactorily resisted, distortion of the casing under load may permit a change in the mesh of one or more pairs of meshed gears thereby leading to excessive wear, inefficient power transmission and a large increase in gear noise. In certain noise sensitive naval vessels, the problem of gear noise, leading to noise transmission into the water surrounding the vessel is of considerable concern.

A noise-sensitive vessel, of the prior art, generally are equipped with a large rigid sub-base which is shock-mounted to the frame of the vessel. The turbines and gearing are rigidly mounted on the sub-base. The casing of the gearing assembly, while itself a relatively rigid member, is further strengthened by being rigidly affixed to the sub-base. The sub-base is, however a parasitic mass which does not contribute actively to the propulsion of the vessel. Elimination of the sub-base, or at least a substantial reduction in its parasitic weight, is clearly a desirable objective. In order to achieve this objective, however, it is necessary to offset the loss of structural stiffness which the gear casing formerly received from its rigid mounting on the sub-base.

A further problem with the gear casing of the prior art, and one which is contrary to the desire for increased stiffness, is brought about by the problem of mounting the large bull gear within the casing. The casing is conventionally fabricated in three major welded pieces. A lower casing and an upper casing are split horizontally at a bolted flange passing through the center of the shaft of the bull gear and encircling the entire casing. An oil pan extends downward below the lower casing to cover the lower protrusion of the bull gear extending below the lower casing. The oil pan is attached to the lower casing by a bolted flange.

To install the gearing assembly, the oil pan and lower casing are first installed in the vessel; then the bull gear, with its shafts, is installed on lower halves of journal bearings provided in the upper perimeter of the lower casing. Once the bull gear is in place, the upper casing is installed. The upper casing carries lower halves of journal bearings for shafts of the first stage reduction gears and input pinions. Thus, after the upper casing is in place, the remainder of the gearing, as well as suitable covers, may be installed.

The three separate bolted-together welded pieces of the prior art would not provide the required rigidity if deprived of the support of a massive rigid sub-base.

OBJECTS AND SUMMARY OF THE INVENTION

Accordingly, it is an object of the invention to provide a casing for a gearing assembly which overcomes the drawbacks of the prior art.

It is a further object of the invention to provide a one-piece casing for a marine gearing assembly which permits installation of the bull gear therein.

It is a still further object of the invention to provide a one-piece casing for a marine gearing assembly having at least one open slot in the top thereof through which the bull gear and its shafts may be lowered for installation thereof in the casing.

It is a still further object of the invention to provide a one-piece casing for a marine gearing assembly which integrally includes lower bearing halves for a bull gear and for supporting shafts of substantially all pinions and reduction gears in the gearing assembly.

It is a still further object of the invention to provide a one-piece casing for a marine gearing assembly having a cross-shaped (when viewed in plan) slot therein, the cross-shaped slot having dimensions for permitting the lowering of a bull gear, with its attached shafts, into position in the gear casing.

Briefly stated, the present invention provides a one-piece marine gear casing having a cross-shaped slot therein as seen in a plan view. The cross-shaped slot permits lowering a bull gear with its attached shafts into the gear casing. The slot is transversely braced after installation of the bull gear to reduce the possibility of vibration of the housing. The cross-shaped slot is enlarged at its lower extremity to permit the installation of upper bearing halves in oppositon to lower bearing halves in the gear casing. The upper and lower bearing halves provide rotatable support for the shafts of the bull gear. Upper surfaces of the gear casing provide support for additional lower bearing halves for the shafts of gears and pinions employed to transmit torque from one or more input shafts to the bull gear.

According to an embodiment of the invention, there is provided a gear casing for a marine gearing assembly comprising a casing, the casing including a one-piece welded member, the one-piece welded member including first and second box-shaped rails along first and second sides thereof for mounting the casing to a support structure, a downward protrusion extending integrally downward from the one-piece welded member, the downward protrusion being adapted for the fitting therein of a bull gear, first and second opposed edges in the casing defining therebetween a longitudinally disposed vertical slot, the first and second opposed edges being separated by a transverse distance sufficient to permit the passage therethrough of shafts coaxially affixed to the bull gear, the vertical slot including a transverse slot generally vertically aligned with the downward protrusion, the transverse slot including a longitudinal dimension and a transverse dimension effective to permit the downward passage therethrough of the bull gear during the installation thereof, at least one lower bearing half disposed in a lower extremity of the slot, the lower extremity including a wide portion adjacent the at least one lower bearing half, the wide portion having a transverse dimension and a height above the at least one lower bearing half sufficient to permit installation of a upper bearing half therein whereby a rotatable support of the shafts is provided and at least one cross brace fittable between the first and second edges above the shafts.

According to a feature of the invention, there is provided a gearing assembly comprising a one-piece gear casing, a downward protrusion extending downward from the one-piece gear casing, first and second vertical opposed edges defining therebetween a vertical slot longitudinally disposed throughout a longitudinal dimension of the one-piece gear casing, a transverse slot in the vertical slot, a wide portion adjacent a lower extremity of the vertical slot, at least one wide portion in the lower extremity, a bull gear having first and second shafts coaxially affixed thereto, at least one of the first and second shafts being supportingly fittable upon the wide portion, the vertical slot and the transverse slot having transverse and longitudinal dimensions sufficient to permit the lowering of the bull gear with its coaxially affixed first and second shafts therethrough for fitting the at least one of the first and second shafts upon the at least one wide portion, the downward protrusion being disposed for permitting a lower portion of the bull gear to enter therein, at least one upper bearing half fittable within the wide portion over the at least one of the first and second shafts, at least one cross brace fittable between the first and second opposed vertical edges for bracing an upper portion of the one-piece gear casing, at least one inclined upper surface in the one-piece gear casing, a plurality of lower bearing halves in the at least one inclined upper surface, a plurality of shafts rotatably supportable in the plurality of lower bearing halves, at least one pinion affixed to one of the plurality of shafts and having a surface thereof in meshed contact with a surface of the bull gear, and gear means for driving the at least one pinion from an external source of torque whereby the bull gear is forcibly rotated.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

In the following disclosure, a gearing arrangement adapted for receiving torque from two turbines and for delivering torque to a single propeller shaft is described for purposes of illustration. Other equipment combinations may be equally served by the present invention, and an embodiment containing adaptation for such other equipment combinations should be considered to fall within the scope hereof. In general, the gear sequence and other details employed to transmit torque from the second turbine to the bull gear are substantially identical to the apparatus for transmitting the torque input from the first turbine thus, the drawings and description hereinafter have been simplified by omitting the repetitive details of the transmission of torque from the second turbine to the bull gear.

Figure 1:
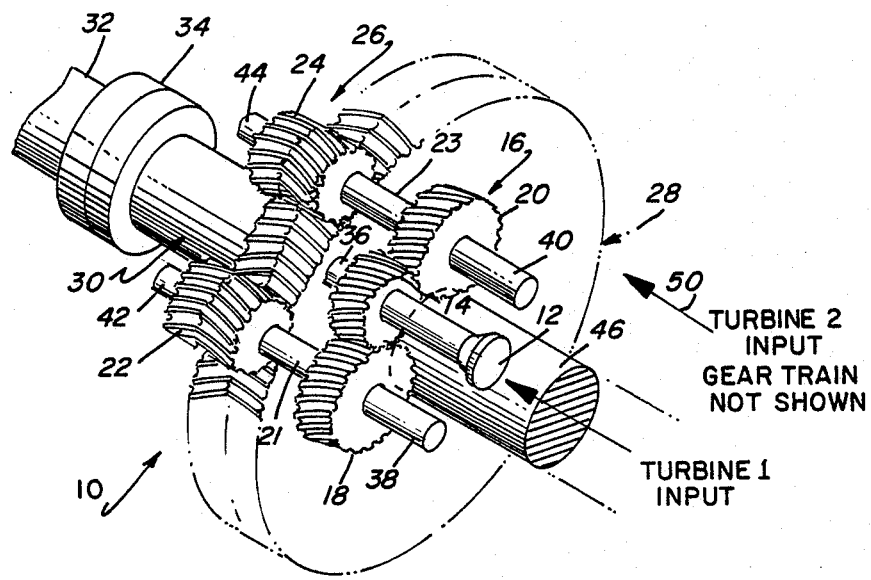
FIG. 1 is a simplified perspective view of a conventional gear arrangement in a naval vessel isolated from its supporting structure.

FIG. 1 shows a gear train, generally at 10, in isolation from its gear casing (not shown) in order to simplify the introductory tracing of torque flow. A torque input from a turbine (not shown) is applied to an input shaft 12 which is coaxially coupled to an input pinion 14. Input pinion 14 is part of a first gear reduction 16, the remainder of which is composed of reduction gears 18 and 20 which are in meshed contact with input pinion 14 on opposed sides thereof. Reduction gear 18 is coaxially coupled through an intermediate shaft 21 to a second reduction pinion 22. Similarly, reduction gear 20 is coupled through a intermediate shaft 23 to a second reduction pinion 24. Second reduction pinions 22 and 24 form part of a second reduction gearing 26, the remainder of which is composed of an output or bull gear 28. Bull gear 28 is coaxially coupled to an output shaft 30 which is, in turn, connected to a propeller shaft 32 using, for example, a bolted coupling 34.

As is conventional, shaft 12, intermediate shafts 21 and 23 and output shaft 30 are rotatably supported in suitable bearings (not shown) which are accommodated in the casing of the gearing assembly to be described hereinafter. In addition, stub shafts 36, 38, 40, 42, 44, and 46 are provided on the opposite sides of input pinion 14, reduction gears 18 and 20, second reduction pinions 22 and 24 and bull gear 28 respectively for supportive engagement by bearings (not shown).

Torque input from a second turbine, indicated by an arrow 50, may be similarly applied to bull gear 28 using corresponding pinions and gears to those described hereinabove, angularly displaced about the axis of bull gear 28 from the positions of those described above.

Figure 2:
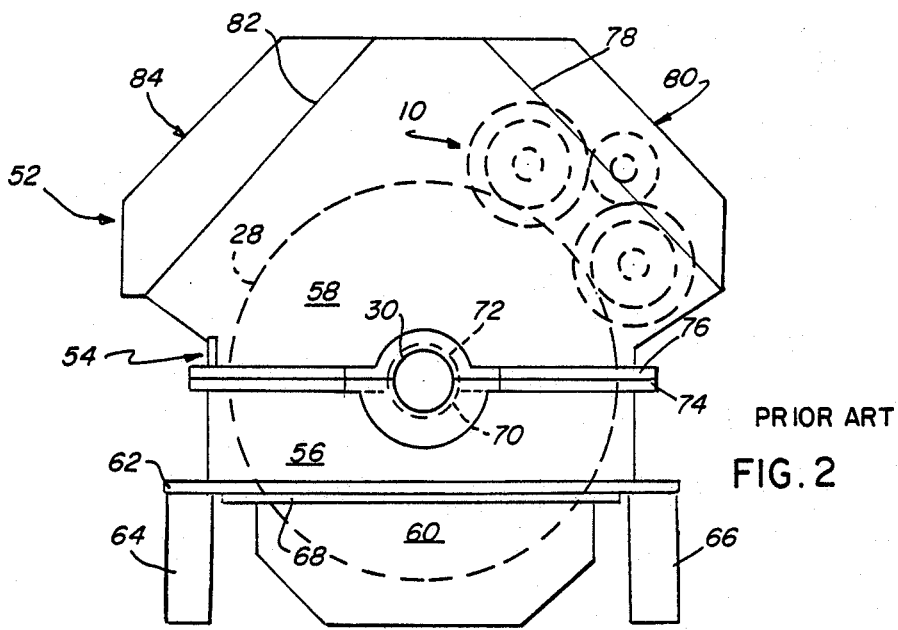
FIG. 2 is an end view, looking forward, of a gearing assembly according to the prior art.
Figure 3:
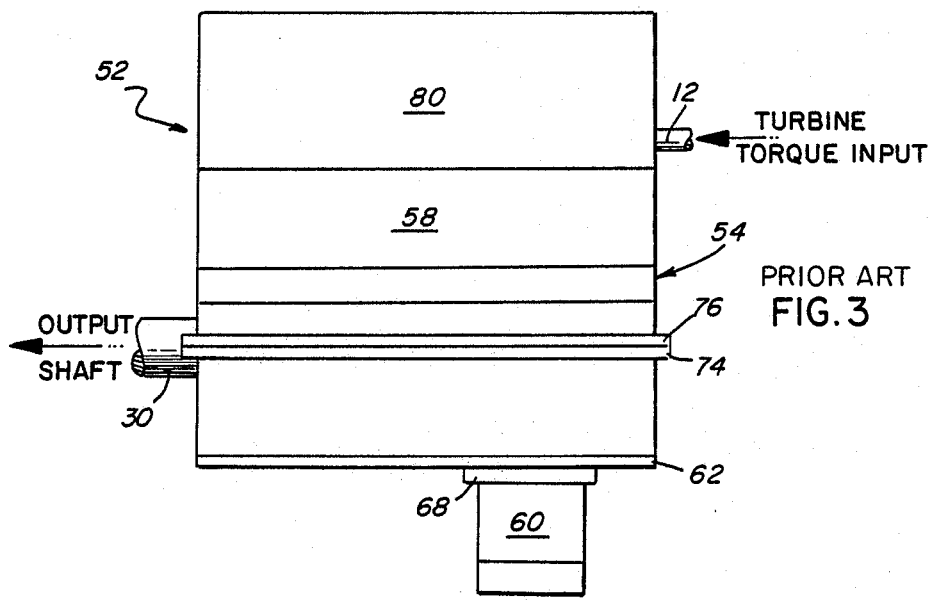
FIG. 3 is a side view of the gearing assembly of FIG. 2.

Referring now to FIGS. 2 and 3, a representative conventional gearing assembly 52 for supporting and containing gear train 10 is shown. A casing 54 consists of three major welded elements; namely, a lower casing 56, an upper casing 58 and an oil pan 60. A mounting flange 62 on lower casing 56 is employed for rigidly affixing gearing assembly 52 to right and left supports 64 and 66, which may be part of, for example, a ship's frame or a vibration-isolated sub-base (not otherwise shown). Oil pan 60 permits bull gear 28 to extend downward between right and left supports 64 and 66 without requiring that the entire vertical dimension of gearing assembly 52 be increased to accommodate the vertical dimension of bull gear 28 including the downward-protruding portion of bull gear 28. Oil pan 60 is affixed to the bottom of lower casing 56 using a bolted flange 68.

An upper perimeter of lower casing 56 includes a lower bearing half 70 for rotatably supporting output shaft 30, as well as a similar lower bearing half (not shown) for rotatably supporting stub shaft 46 (see FIG. 1). Upper casing 58 includes an upper bearing half 72 for mating with lower bearing half 70 to complete the rotatable support of output shaft 30, as well as an additional upper bearing half (not shown) for mating with the non-illustrated lower bearing half to complete the rotatable support of stub shaft 46 (FIG. 1). An upper flange 74 about the upper perimeter of lower casing 56 mates with a lower flange 76 about the lower perimeter of upper casing 58.

The shafts, gears and pinions (the positions of some of which are indicated in dashed line) carrying torque from the turbine(s) to bull gear 28 are disposed within an upper portion of upper casing 58. Access to the illustrated set of such shafts, gears and pinions is provided by an upper opening 78 which is closed fluid tight by a cover 80. A similar upper opening 82, providing access to the non-illustrated set of shafts, gears and pinions, is closed fluid tight by a cover 84. Upper casing 58 conventionally includes supports for bearing halves as an integral part of its weldment for supporting such shafts, gears and pinions as will be more fully detailed hereinafter. Upper bearing halves (not shown) are mated with the integrally supported lower bearing halves to complete the support for the shafts, gears and pinions.

The principal reason for splitting casing 54 along the line defined by the junction of upper lower casing flange 74 and lower upper casing flange 76 resides in the need to permit the installation of bull gear 28 which, at the time of installation, has its output shaft 30 and stub shaft 46 (FIG. 1) integrally affixed thereto. With upper casing 58 out of the way, and with lower casing 56 installed, bull gear 28 is lowered into place until output shaft 30 rests centered in lower bearing half 70 and stub shaft 46 rests centered in a corresponding lower bearing half (not shown) in lower casing 56. Upper casing 58 may then be installed over bull gear 28 and the remaining shafts, gears and pinions installed within it.

The bolting of bolted flange 68 to the bottom of lower casing 56 and the bolting together of upper lower casing flange 74 and lower upper casing flange 76 is relied on both to unify the three major welded parts of casing 54 into a rigid unitary assembly, as well as to provide a liquid-tight enclosure for the parts within. Unfortunately, a bolted flange junction is less than perfect for providing structural rigidity.

Figure 4:
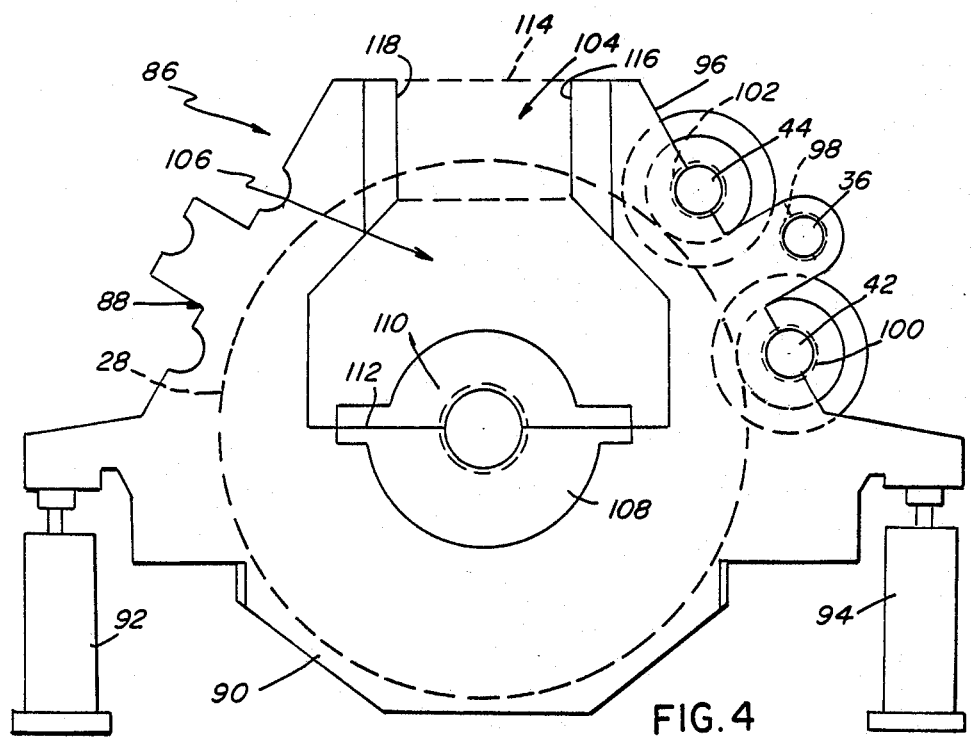
FIG. 4 is an end view of a one-piece gear casing according to an embodiment of the invention in which the positions of some of the gears, pinions and shafts are indicated.

Referring now to FIG. 4, there is shown, generally at 86, a gearing assembly according to an embodiment of the invention from which all covers are omitted to reveal the internal components. Gearing assembly 86 includes a one-piece casing 88 which combines the functions of upper casing 58, lower casing 56 and oil pan 60 into a single integrally welded unit having substantially improved structural stiffness while reducing the weight of gearing assembly 86. One-piece casing 88 includes an integrally welded downward protrusion 90 for accommodating the downward protrusion of bull gear 28. A series of supports 92 and 94 are provided along the edges of one-piece casing 88 for mounting one-piece casing 88 to a suitable foundation structure (not shown). The foundation structure may be a ship's frame or an intermediate sub-base to which supports 92 and 94 are rigidly affixed as in the prior art or, alternatively, supports 92 and 94 may be mounted on a foundation structure through a plurality of vibration dampers, whose exact nature is immaterial to the present invention.

An inclined upper surface 96 contains a lower bearing half 98 for supporting stub shaft 36, as well as lower bearing halves 100 and 102 for supporting stub shafts 42 and 44 respectively. An additional plurality of bearing halves are supported on one-piece casing 88 axially aligned behind the bearing halves illustrated in FIG. 4 for supporting the shafts on the opposed side of the gears and pinions. Conventional upper bearing halves (not shown) are affixed over the shafts in the lower bearing halves and are retained therein by conventional means.

A slot 104 passing centrally through the upper portion of one-piece casing 88 permits the passage of output shaft 30 (and stub shaft 46) therethrough, and thereby permits lowering bull gear 28 into place without requiring a horizontal split in one-piece casing 88 at the axis of output shaft 30 as was necessary with the apparatus of the prior art. Slot 104 widens into a wide portion 106 at its lower end. A lower bearing half 108 is centrally disposed at the lower extremity of wide portion 106. The extra width provided by wide portion 106 provides clearance for fitting an upper bearing half 110 therein and for rigidly affixing upper bearing half 110 to the remainder of one-piece casing 88 using, for example, a plurality of bolts (not shown) passing through a pair of transverse flanges 112. A cross brace 114, shown in dashed line, may be installed between opposed edges 116 and 118 of slot 104 to resist distortion and/or tuning-fork type vibrations of the upward-extending portions of one-piece casing 88 after bull gear 28 is in place. The cross brace 114 may be a pair of blocks, as shown, or a single continuous member.

Figure 5:
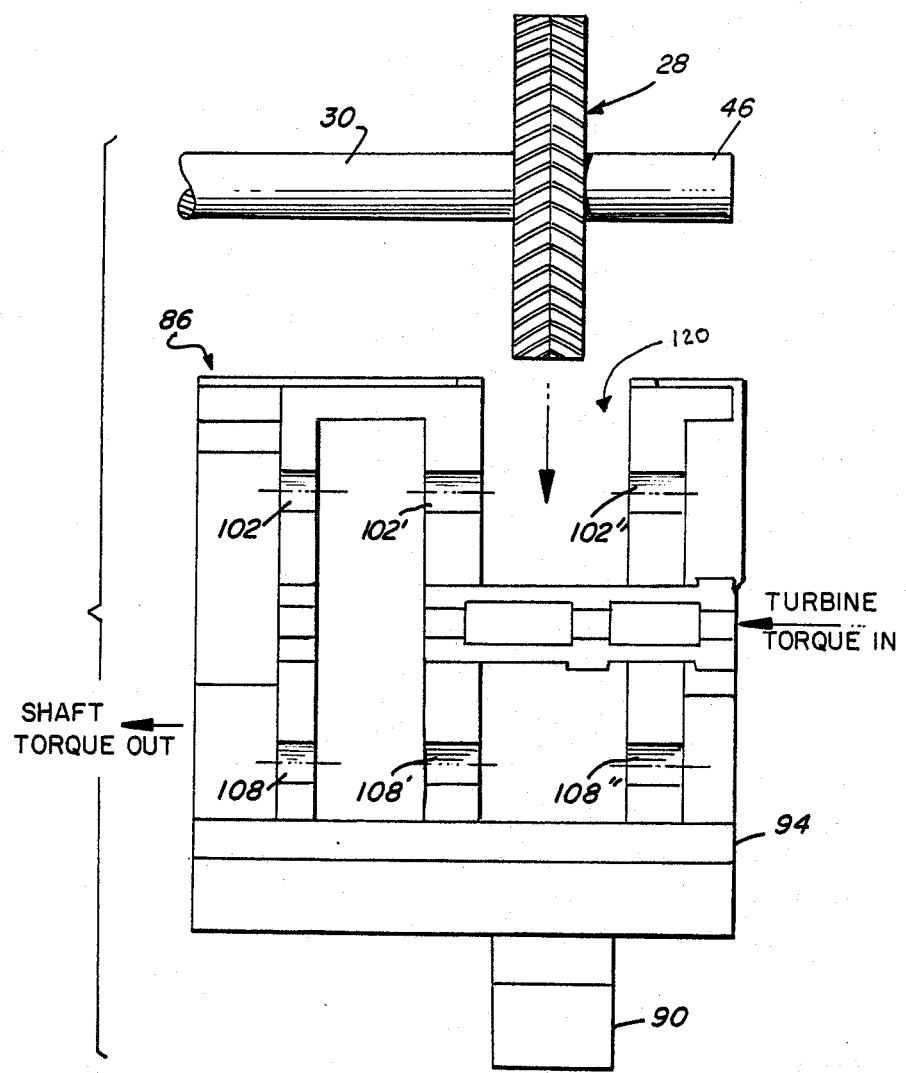
FIG. 5 is a partial side view of the one-piece gear casing of FIG. 4 showing the manner in which the bull gear, with its coaxially affixed shafts, is lowered into the one-piece gear casing.

Referring now to FIG. 5, a side view of the embodiment of the invention of FIG. 4 is shown at an earlier point in the assembly thereof. As previously mentioned, additional lower bearing halves are aligned in the axial directions behind those illustrated in FIG. 4. Such additional lower bearing halves are identified in FIG. 5 with the same reference designators as in FIG. 4 but with successively higher primed values from left to right. The preceding description, together with the illustrated arrangement of the additional lower bearing halves, represents full disclosure to one skilled in the art and thus additional description thereof would be redundant.

Figure 6:
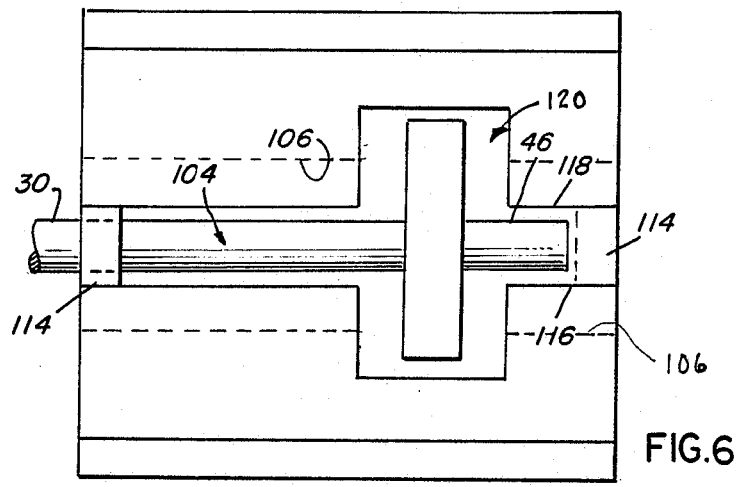
FIG. 6 is a top view of the one-piece gear casing of FIGS. 4 and 5.

A transverse slot 120 is provided in one-piece casing 88 having an axial width sufficient to permit bull gear 28 to pass downward therethrough. Referring now also to FIG. 6, wherein the final location of bull gear 28 is indicated in dashed line, transverse slot 120 is also seen to have a transverse dimension sufficient to permit lowering bull gear 28 therethrough. The combination of slot 104, and transverse slot 120 is generally cross-shaped as would be expected from the shape of the apparatus to be lowered therethrough.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A gearing assembly comprising:
   a one-piece gear casing; including an integral oil pan and gear casing without horizontal joint;
   a downward protrusion extending downward from said one-piece gear casing;
   first and second vertical opposed edges defining therebetween a vertical slot longitudinally disposed throughout a longitudinal dimension of said one-piece gear casing;
   a transverse slot in said vertical slot;
   a wide portion adjacent a lower extremity of said vertical slot;
   a bull gear having first and second shafts coaxially affixed thereto;
   at least one of said first and second shafts being supportingly fittable upon said wide portion;
   said vertical slot and said transverse slot having transverse and longitudinal dimensions sufficient to permit the lowering of said bull gear with its affixed first and second shafts therethrough for fitting said at least one of said first and second shafts upon said at least one wide portion;
   said downward protrusion being disposed for permitting a lower portion of said bull gear to enter therein;
   at least one upper bearing half fittable within said wide portion over said at least one of said first and second shafts;
   at least one cross brace fittable between said first and second vertical opposed edges for bracing an upper portion of said one-piece gear casing;
   at least one inclined upper surface in said one-piece gear casing;
   a plurality of lower bearing halves in said at least one inclined upper surface;
   a plurality of shafts rotatably supportable in said plurality of lower bearing halves;
   at least one pinion affixed to one of said plurality of shafts and having a surface thereof in meshed contact with a surface of said bull gear; and,
   gear means for driving said at least one pinion from an external source of torque whereby said bull gear is forcibly rotated;

In further response to the above identified Office Action, Applicant submits the following arguments for allowance and respectfully requests that the Examiner reconsider his position.

2. In combination, a one-piece gear casing and a marine gear drive wherein the marine gear drive includes a bull gear having fore and aft stub shafts fixed thereto; the marine gear drive further including at least one input drive shaft connected to at least one intermediate driven shaft which, in turn, drives the bull gear; the combination comprising:
   a fabricated one-piece gear casing defining an integral oil pan, and upper and lower gear casings without horizontal joint;
   a longitudinal slot formed in the upper portion of the gear casing for accepting therethrough the bull gear fore and aft drive shafts; the longitudinal slot having opposite vertical walls approximately coextensive therewith;
   a transverse slot formed in the upper portion of the gear casing and extending crosswise to the longitudinal slot for accepting the bull gear therethrough;
   a wide portion extending downwardly from the longitudinal slot including at least one lower bearing casing half formed in the one piece gear casing for supporting at least one bull gear shaft;
   at least one inclined external upper gear casing surface;
   a plurality of lower bearing casing halves formed in the at least one inclined external upper gear casing surface for receiving the at least one input shaft and the at least one intermediate driven shaft in respective inclined surface lower bearing casing halves;
   upper bearing casing halves mounted respectively to the bull gear lower bearing casing half, the input shaft lower bearing casing half, and the intermediate shaft lower bearing casing half; and,
   at least one cross brace mounted in the upper portion of the one-piece gear casing between opposite vertical walls of the longitudinal slot.

3. The combination gear casing and marine drive recited in claim 2 wherein the input drive shaft includes a first drive pinion and the intermediate driven shaft includes a first reduction gear meshing with the first drive pinion; the intermediate driven shaft further including a second reduction pinion meshing with the bull gear.

* * * * *